(12) United States Patent
Moon et al.

(10) Patent No.: US 12,007,789 B2
(45) Date of Patent: Jun. 11, 2024

(54) VERTICAL TAKE-OFF AND LANDING AIRCRAFT USING HYBRID ELECTRIC PROPULSION SYSTEM

(71) Applicants: YONGBEEAT, INC., Incheon (KR); CHANGINAVIATION CO., LTD., Incheon (KR)

(72) Inventors: Chang Mo Moon, Seoul (KR); Ji Ho Moon, Seoul (KR); Sung Su Kim, Incheon (KR)

(73) Assignees: YONGBEEAT, INC., Incheon (KR); CHANGINAVIATION CO., LTD., Incheon (KR)

( * ) Notice: Subject to any disclaimer, the term of this patent is extended or adjusted under 35 U.S.C. 154(b) by 350 days.

(21) Appl. No.: 17/438,131

(22) PCT Filed: Mar. 9, 2020

(86) PCT No.: PCT/KR2020/003245
§ 371 (c)(1),
(2) Date: Sep. 10, 2021

(87) PCT Pub. No.: WO2020/184934
PCT Pub. Date: Sep. 17, 2020

(65) Prior Publication Data
US 2022/0163978 A1 May 26, 2022

(30) Foreign Application Priority Data
Mar. 13, 2019 (KR) .......................... 10-2019-0028581

(51) Int. Cl.
*G05D 1/08* (2006.01)
*B60L 50/60* (2019.01)
(Continued)

(52) U.S. Cl.
CPC ............ *G05D 1/0858* (2013.01); *B60L 50/60* (2019.02); *B60L 58/10* (2019.02); *B64C 27/54* (2013.01);
(Continued)

(58) Field of Classification Search
CPC ...... G05D 1/0858; G05D 1/085; B60L 50/60; B60L 58/10; B60L 2200/10;
(Continued)

(56) References Cited

U.S. PATENT DOCUMENTS

5,823,468 A * 10/1998 Bothe ...................... B64B 1/34
244/209
9,162,771 B2 * 10/2015 Roggemans ............ B64C 27/12
(Continued)

*Primary Examiner* — Medhat Badawi
(74) *Attorney, Agent, or Firm* — Bridgeway IP Law Group, PLLC; Sang Ho Lee; Hyun Woo Shin (57) ABSTRACT

A vertical take-off and landing aircraft using a hybrid electric propulsion system, according to an embodiment of the present invention, includes: a first control step (S1) of changing a destination when an engine (10), a power generator (20), an engine control unit (30), a power management device (40), a control unit (50), a battery management system (60), a main battery (62) and the like malfunction, thereby causing a normal flight to be difficult; a second control step (S2) of performing control so that an aerial vehicle (1) glides to a point (T), at which same has entered a first space (CEP-1) required for landing or a wider second space (CEP-2) considered safe, and maintains lift and has minimized flight air resistance after passing through the point (T); a third control step (S3) of performing control so that lift is increased and performing control so that a nose cone is switched into an upward direction; and a fourth control step (S4) of performing control so that lift is gradually reduced, and controlling a second variable-pitch control device (122) so that thrust does not act on the aerial vehicle
(Continued)

at the moment the aerial vehicle lands, and thus the present invention can vertically land while minimizing impact to be applied to the aerial vehicle.

10 Claims, 7 Drawing Sheets

(51) Int. Cl.
| | |
|---|---|
| B60L 58/10 | (2019.01) |
| B64C 27/54 | (2006.01) |
| B64C 29/00 | (2006.01) |
| B64D 27/02 | (2006.01) |
| B64D 27/24 | (2006.01) |
| B64D 45/00 | (2006.01) |
| G05D 1/00 | (2006.01) |

(52) U.S. Cl.
CPC .......... *B64C 29/0016* (2013.01); *B64D 27/02* (2013.01); *B64D 27/24* (2013.01); *B64D 45/00* (2013.01); *G05D 1/085* (2013.01); *B60L 2200/10* (2013.01); *B64D 27/026* (2024.01)

(58) Field of Classification Search
CPC .. B60L 2250/10; B60L 3/0046; B60L 3/0084; B60L 3/0092; B60L 58/20; B64C 27/54; B64C 29/0016; B64C 11/305; B64C 13/16; B64C 29/0025; B64C 11/46; B64D 27/02; B64D 27/24; B64D 45/00; B64D 2027/026; B64D 31/12; B64D 45/04; B64D 43/00; B64D 47/02; Y02T 10/70; Y02T 50/40; Y02T 50/60
See application file for complete search history.

(56) References Cited

U.S. PATENT DOCUMENTS

| | | | | |
|---|---|---|---|---|
| 9,174,728 B2* | 11/2015 | Altmikus | | B64C 27/82 |
| 9,180,964 B2* | 11/2015 | Smith | | B64C 27/006 |
| 9,187,174 B2* | 11/2015 | Shaw | | B64C 27/28 |
| 9,194,285 B2* | 11/2015 | Botti | | B64C 27/14 |
| 9,586,690 B2* | 3/2017 | Rajashekara | | F02C 7/32 |
| 9,708,059 B2* | 7/2017 | Logan | | B64C 15/00 |
| 10,035,604 B2* | 7/2018 | Bak | | B64D 31/06 |
| 10,443,504 B2* | 10/2019 | Dalal | | F02C 7/268 |
| 10,562,623 B1* | 2/2020 | Sloan | | B64D 31/06 |
| 10,661,894 B1* | 5/2020 | Erdozain, Jr. | | B64C 3/56 |
| 11,034,245 B1* | 6/2021 | Cottrell | | B60L 53/30 |
| 11,059,598 B2* | 7/2021 | Arkus | | B64C 25/52 |
| 11,738,874 B2* | 8/2023 | Becker | | B64D 27/06 244/55 |
| 2003/0062442 A1* | 4/2003 | Milde, Jr. | | B64C 29/0025 244/12.3 |
| 2003/0094537 A1* | 5/2003 | Austen-Brown | ... | B64C 29/0033 244/7 R |
| 2011/0266081 A1* | 11/2011 | Novikov-Kopp | | B60V 1/08 114/272 |
| 2012/0091257 A1* | 4/2012 | Wolff | | B64C 39/024 244/12.4 |
| 2013/0092789 A1* | 4/2013 | Botti | | B60L 50/15 244/54 |
| 2013/0094963 A1* | 4/2013 | Rolt | | B64D 27/02 416/31 |
| 2013/0134264 A1* | 5/2013 | Carter, Jr. | | B64C 27/025 244/6 |
| 2014/0117148 A1* | 5/2014 | Dyrla | | B64D 35/08 244/17.13 |
| 2014/0339372 A1* | 11/2014 | Dekel | | G05D 1/0858 244/7 R |
| 2015/0197335 A1* | 7/2015 | Dekel | | B64C 27/52 701/5 |
| 2016/0023773 A1* | 1/2016 | Himmelmann | | B64D 27/24 903/903 |
| 2016/0107748 A1* | 4/2016 | Luyks | | B64C 27/82 416/151 |
| 2016/0236790 A1* | 8/2016 | Knapp | | B64C 11/001 |
| 2017/0057650 A1* | 3/2017 | Walter-Robinson | | H02J 7/0068 |
| 2017/0072755 A1* | 3/2017 | Zhou | | B60K 16/00 |
| 2017/0203839 A1* | 7/2017 | Giannini | | B64D 27/24 |
| 2017/0247114 A1* | 8/2017 | Moulon | | B64D 27/02 |
| 2017/0320585 A1* | 11/2017 | Armstrong | | B64D 27/10 |
| 2018/0163558 A1* | 6/2018 | Vondrell | | B64D 27/10 |
| 2018/0178921 A1* | 6/2018 | Bak | | B64D 27/02 |
| 2018/0201384 A1* | 7/2018 | Barth | | B64D 31/06 |
| 2019/0118943 A1* | 4/2019 | Machin | | B64C 11/30 |
| 2019/0256200 A1* | 8/2019 | Neff | | B64D 27/24 |
| 2019/0263515 A1* | 8/2019 | Karem | | B64C 39/024 |
| 2019/0322379 A1* | 10/2019 | Mackin | | F02C 7/057 |
| 2020/0023701 A1* | 1/2020 | Salem | | B64C 37/00 |
| 2020/0148372 A1* | 5/2020 | Long | | B64D 27/02 |
| 2020/0148373 A1* | 5/2020 | Long | | F01D 15/10 |
| 2020/0149427 A1* | 5/2020 | Long | | B64D 27/02 |
| 2020/0153252 A1* | 5/2020 | Long | | H02J 4/00 |
| 2020/0290742 A1* | 9/2020 | Kumar | | B64D 27/24 |
| 2021/0387723 A1* | 12/2021 | Moon | | B64D 27/24 |
| 2022/0163978 A1* | 5/2022 | Moon | | G05D 1/085 |

* cited by examiner

VERTICAL TAKE-OFF AND LANDING AIRCRAFT USING HYBRID ELECTRIC PROPULSION SYSTEM

TECHNICAL FIELD

The present disclosure relates to a vertical take-off and landing aircraft using a hybrid electric propulsion system.

BACKGROUND ART

A vertical take-off and landing aircraft based on a rotary wing like a helicopter has an advantage that it does not require separate take-off and landing facilities or equipment, but has low performance compared to a fixed wing aircraft of the same class in terms of high-speed flight, long endurance, and high-altitude performance.

Compared to a fixed wing aircraft to which various propulsion systems ranging from an electric motor to a jet engine can be applied, the range of propulsion systems employable for a vertical take-off and landing aircraft, which depends upon shaft horsepower of an engine, is limited as the weight of the aircraft is reduced.

In particular, a reciprocating engine widely used for a small aircraft with a maximum take-off weight (MTOW) of 10 kg to 300 kg has a very small weight-to-power ratio of about 2. In order to supply power required for vertical take-off and landing, the engine is very large in volume and weight compared to the fixed wing aircraft of the same class, the weight of a propulsion system is excessive compared to the empty weight of the aircraft, and thus it is difficult to secure the payload and endurance time required for missions.

Accordingly, a propulsion system using a battery and an electric motor is widely used in small aircraft, but due to technical limitations of current batteries with low energy density, it is not possible to provide sufficient flight time for missions.

An energy source with high specific energy and a power device for converting the same are required for long-term flight, but an energy source with high specific power and a device for converting the same are required for vertical take-off and landing.

However, since there is no energy source and power generator with both high specific energy and specific power, an energy source and power generator with high specific energy are generally mounted in the aircraft for long-term flight.

A lot of energy is required for vertical take-off and landing of an aircraft, and a propulsion system including the power generator needs to be designed to supply sufficient power for vertical take-off and landing, and thus this configuration makes the weight of the entire propulsion system much heavier than the weight required for flight, and thus causes inefficiencies in the weight of the aircraft and the propulsion system.

Recently, efforts have continued to reduce the weight of the propulsion system, increase efficiency, and provide longer flight times by simultaneously using an energy source with high specific energy and an energy source with high specific power.

In one aspect, a vertical take-off and landing aircraft applies a tilting structure in which a propeller is installed on a main wing and a rotation axis of the propeller is switched from a horizontal posture to a vertical posture. The tilting structure makes a propeller shaft take a vertical posture when the vertical takeoff and landing aircraft intends to take off and land vertically, and makes the propeller shaft take a horizontal posture when the vertical takeoff and landing aircraft intends to cruise, and thus an inclination of the propeller shaft may be varied depending on a flight posture. However, the tilting structure requires a number of mechanical components, thereby increasing the weight of the aircraft, and thus there is a problem in long-term flight.

In another aspect, a vertical take-off and landing aircraft using a hybrid electric propulsion system operates a propeller using engine power and battery power, but when abnormality occurs, for example, when abnormality occurs in the engine, a generator mounted on the engine malfunctions, or main battery power is unstable, the amount of available power is insufficient and it is difficult to perform normal vertical landing. In detail, a conventional vertical take-off and landing aircraft or fixed wing aircraft loses flight control in case of emergency, resulting in a sudden increase in flight speed, and as a result, there is a problem of serious collision with the ground, and in this case, most of the passengers usually die.

The present disclosure is devised to solve this problem, in particular, to provide a method for stable landing on a fixed-wing vertical take-off and landing flight platform in case of emergency.

PRIOR ART LITERATURE

[Patent Documents]
(Patent Document 1) KR 10-2011-0112402 A
(Patent Document 2) KR 10-1667330 B1
(Patent Document 3) KR 10-1615486 B1
(Patent Document 4) KR 10-1638964 B1

DISCLOSURE

Technical Problem

Therefore, the present disclosure has been made in view of the above problems, and it is one object of the present disclosure to provide a vertical take-off and landing aircraft using a hybrid electric propulsion system for emergency landing when it is determined that normal vertical landing is difficult due to insufficient available power.

Technical Solution

In accordance with one aspect of the present disclosure, provided is a vertical take-off and landing aircraft using a hybrid electric propulsion system including a first variable pitch control device 121 configured to control a pitch of a lift propeller 111 to generate lift in an aircraft 1, a second variable pitch control device 122 configured to control a pitch of a thrust propeller 112 to generate thrust in the aircraft 1, a controller 50 mounted in the aircraft 1 and configured to control a battery management system 60 using an emergency battery 72 when abnormality occurs in the battery management system 60, and a flight control system 90 configured to control a posture of the aircraft 1 and to set a flight route, wherein the vertical take-off and landing aircraft performs operations including a first control operation S1 of resetting a destination, a second control operation S2 of performing control to maintain lift and to minimize air resistance after the aircraft 1 glides to a point T for entry to a first space CEP-1 required to land the aircraft 1 or a second space CEP-2 that is wider than the first space CEP-1 in consideration of safety and passes through the point T, a third control operation S3 of performing control to improve the lift and performing control to change a nose to an upward direction, and a fourth control operation S4 of performing control to gradually reduce the lift and performing control to prevent thrust from acting on the aircraft at a moment of landing.

In the vertical take-off and landing aircraft using the hybrid electric propulsion system according to an embodiment of the present disclosure, in the first control operation S1, the flight control system 90 may warn a pilot of an emergency situation, may manually receive information on the destination by input of the pilot, and may automatically change the destination when there is no input within a set time.

In the vertical take-off and landing aircraft using the hybrid electric propulsion system according to an embodiment of the present disclosure, the destination may be automatically changed by selecting a closest landing site that does not deviate from the flight route as a first priority landing site and selecting a closest landing site as a second priority landing site when the first priority landing site is too far for emergency flight.

In the vertical take-off and landing aircraft using the hybrid electric propulsion system according to an embodiment of the present disclosure, the destination may be automatically changed by selecting a landing site again by navigating to avoid first and second geographical features when there is the first geographical feature that impedes glide flight to the destination or the second geographical feature by which the aircraft cannot land.

In the vertical take-off and landing aircraft using the hybrid electric propulsion system according to an embodiment of the present disclosure, in the second control operation S2, the first variable pitch control device 121 may be controlled to maintain lift of the aircraft 1 by lowering the aircraft 1 and increasing flight speed, and the second variable pitch control device 122 is controlled to minimize air resistance in flight of the aircraft 1.

In the vertical take-off and landing aircraft using the hybrid electric propulsion system according to an embodiment of the present disclosure, in the third control operation S3, when the aircraft 1 approaches sky above the destination in which it is possible to attempt emergency landing, the first variable pitch control device 121 may be controlled to improve lift of the lift propeller 111 and the flight control system 90 may be controlled to change a noise to an upward direction.

In the vertical take-off and landing aircraft using the hybrid electric propulsion system according to an embodiment of the present disclosure, in the fourth control operation S4, when the aircraft 1 reaches a height for vertical landing, the first variable pitch control device may be controlled to gradually reduce lift of the lift propeller 111, and the second variable pitch control device 122 may be controlled to prevent thrust from acting on the aircraft at a moment of landing.

The details of other embodiments are included in the detailed description and drawings.

Advantageous Effects

The vertical take-off and landing aircraft using the hybrid electric propulsion system according to an embodiment of the present disclosure as configured above may be provided to fix a propeller having a vertically disposed rotation shaft to a main wing, may reduce air resistance by adjusting a pitch angle through the propeller, and may minimize an area in which flight is not allowed using a coordination face such as an aileron, a rudder, or an elevator, thereby realizing safe vertical landing of the aircraft.

BEST MODE

The attached drawings for illustrating exemplary embodiments of the present disclosure are referred to in order to gain a sufficient understanding of the present disclosure, the merits thereof, and the objectives accomplished by the implementation of the present disclosure.

Hereinafter, embodiments of the present disclosure will be described in detail with reference to the accompanying drawings. It should be understood that the embodiments described below are illustratively shown to aid understanding of the present disclosure, and that the present disclosure may be implemented with various modifications different from the embodiments described herein. However, when it is determined that a detailed description of a related well-known function or component may unnecessarily obscure the gist of the present disclosure while describing the present disclosure, the detailed description and specific illustration thereof will be omitted. In addition, the accompanying drawings may not be drawn to scale, but the size of some components may be exaggerated to aid in understanding of the invention.

Terms such as "first" and "second" are used herein merely to describe a variety of constituent elements, but the constituent elements are not limited by the terms. The terms are used only for the purpose of distinguishing one constituent element from another constituent element. For example, a first element may be termed a second element, and a second element may be termed a first element, without departing from the teachings of the present disclosure.

The terms used in the specification are defined in consideration of functions used in the present disclosure, and can be changed according to the intent or conventionally used methods of a producer, and accordingly, definitions of the terms should be understood on the basis of the entire description of the present specification.

Like reference numerals refer to like elements throughout the specification.

EXPLANATION OF REFERENCE NUMERALS

| | |
|---|---|
| 1: aircraft | 2: fuselage |
| 4: main wing | 5: auxiliary wing |
| 6: vertical wing | |
| 10: engine | 14: fuel system |
| 20: generator | 30: engine control device |
| 40: power management unit | 50: controller |
| 60: battery management system | 62: main battery |
| 70: avionic system battery | |
| 72: emergency battery | 80: motor |
| 90: flight control system | 91: aileron |
| 92: elevator | 93: rudder |
| 111: lift propeller | 112: thrust propeller |
| 121 and 122: first and second variable pitch control devices | |

MODE FOR INVENTION

Figure 1:
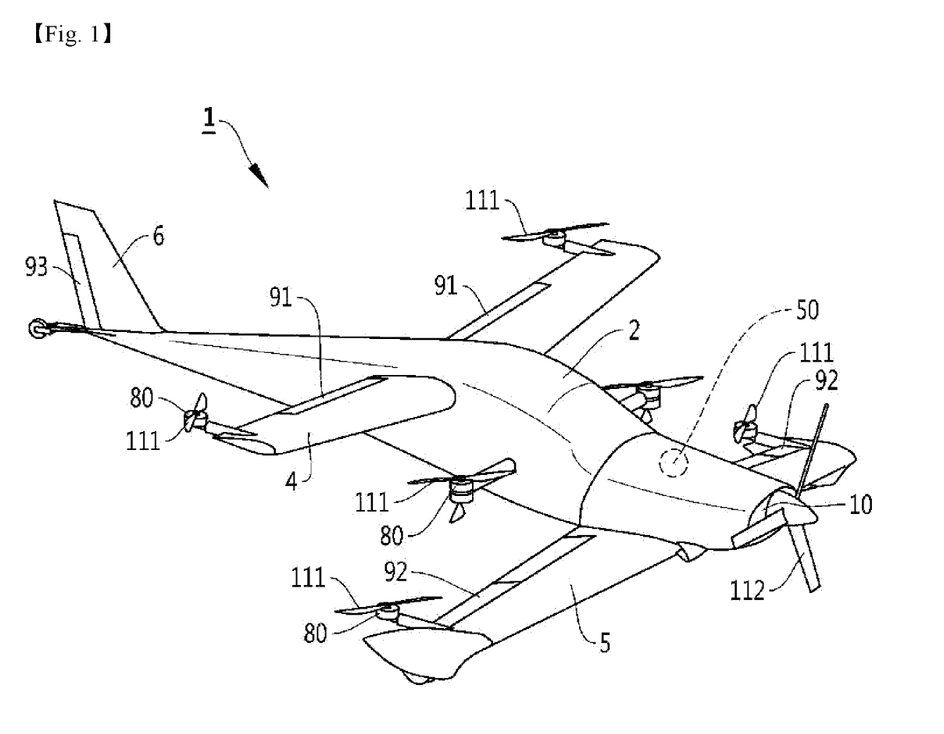
FIG. 1 is a diagram for explaining a vertical take-off and landing aircraft using a hybrid electric propulsion system according to an embodiment of the present disclosure.
Figure 2:
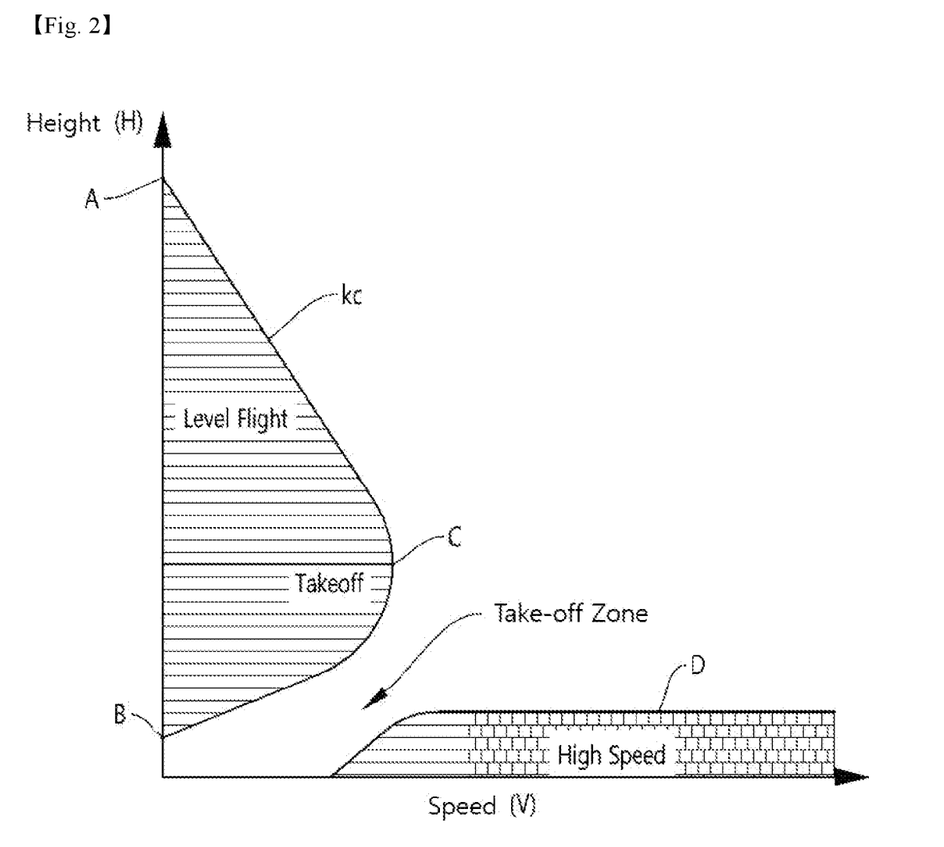
FIGS. 2 and 3 are correlation graphs between altitude and speed for vertical take-off and landing when a vertical take-off and landing aircraft lands vertically.
Figure 3:
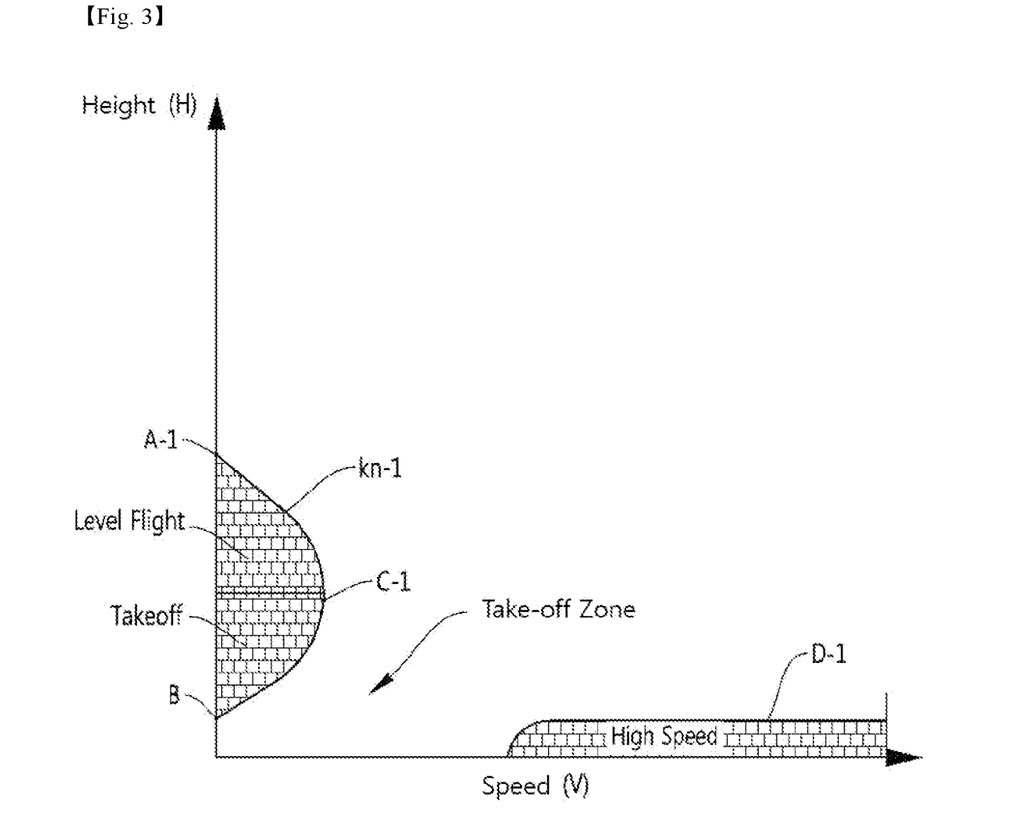
Figure 4:
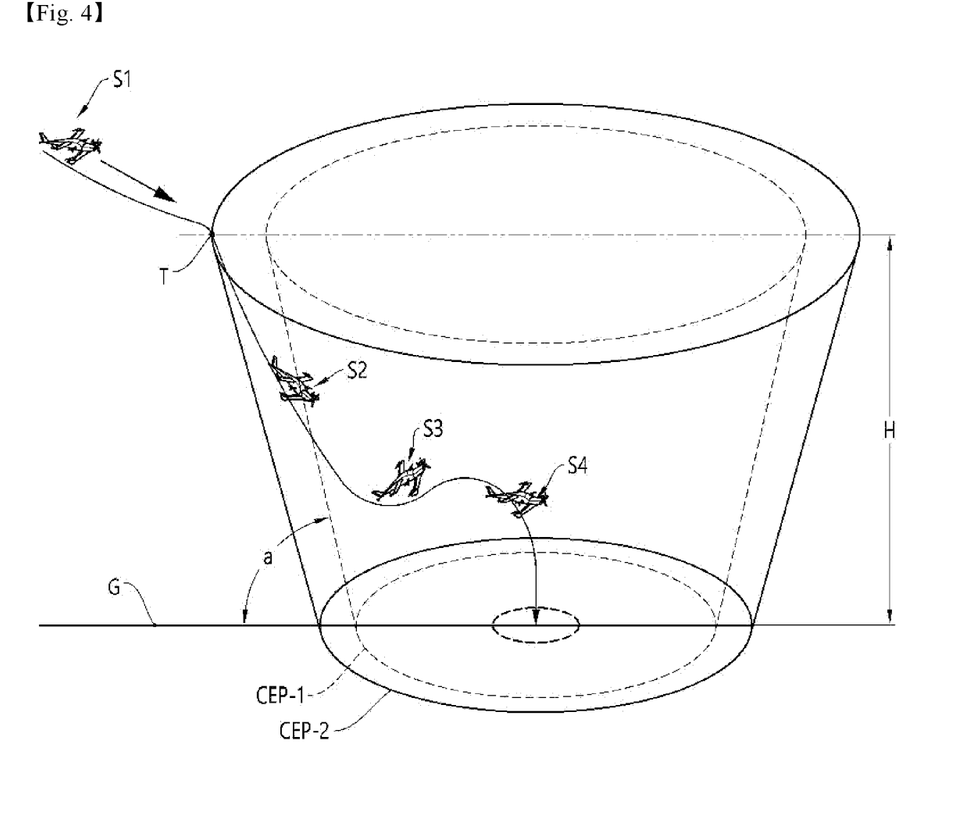
FIGS. 4 to 6 are diagrams for explaining a space in which a vertical take-off and landing aircraft is capable of attempting vertical landing.
Figure 5:
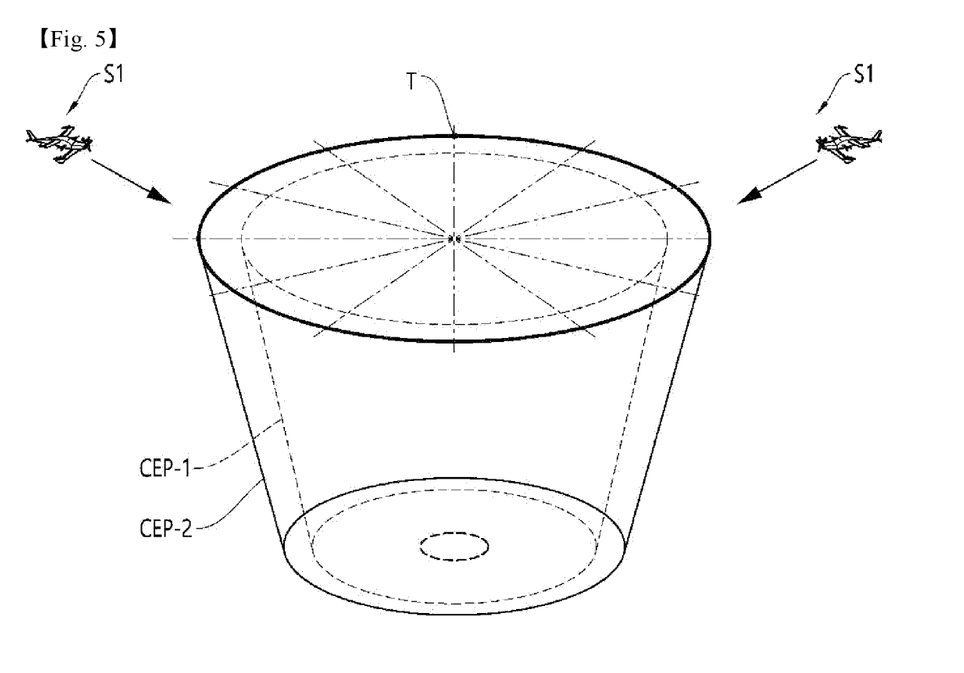
Figure 6:
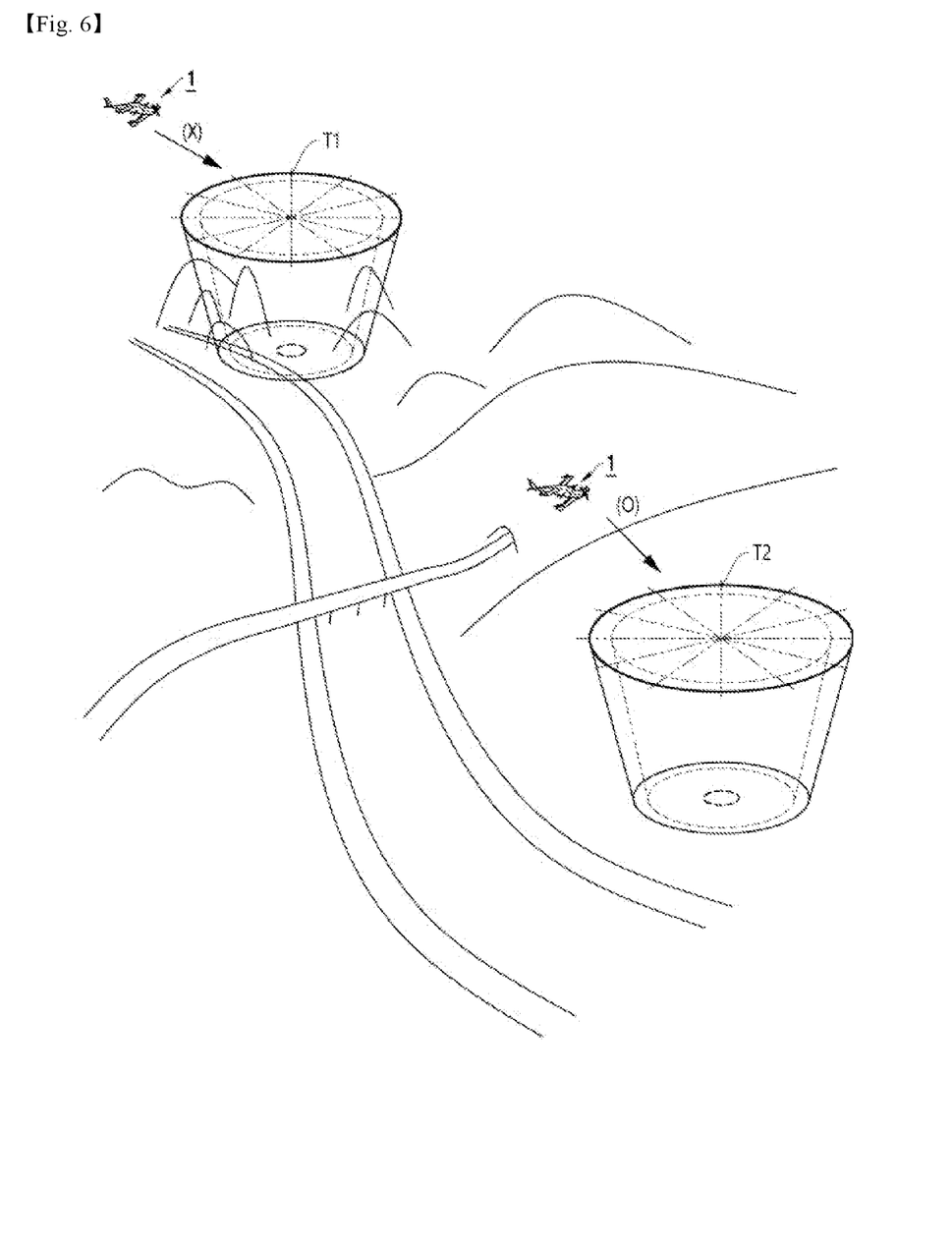
Figure 7:
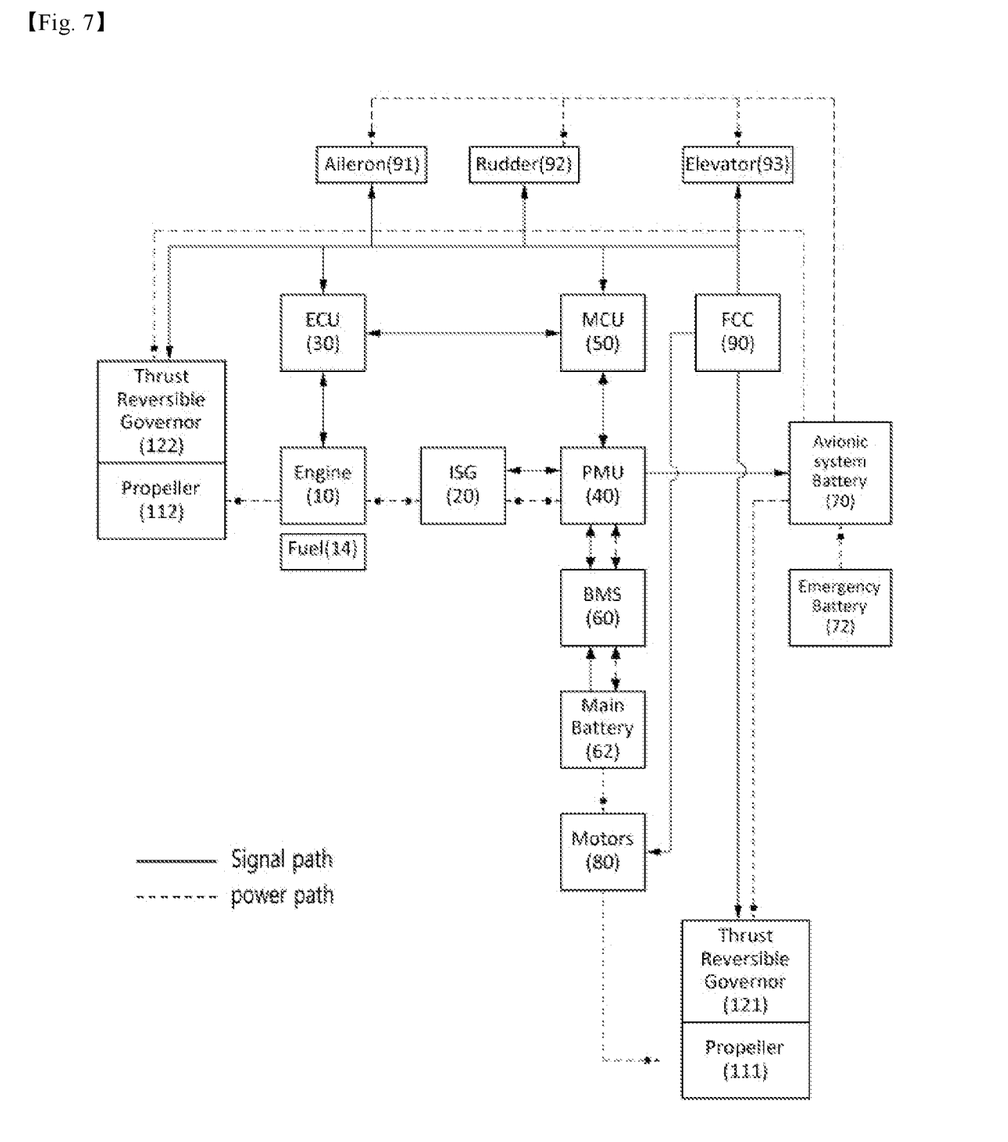
FIG. 7 is a system diagram for explaining an operation of a vertical take-off and landing aircraft using a hybrid electric propulsion system according to an embodiment of the present disclosure.

Hereinafter, a vertical take-off and landing aircraft using a hybrid electric propulsion system according to an embodiment of the present disclosure will be described with reference to FIGS. 1 to 7. FIG. 1 is a diagram for explaining a vertical take-off and landing aircraft using a hybrid electric propulsion system according to an embodiment of the present disclosure. FIGS. 2 and 3 are correlation graphs between altitude and speed for vertical take-off and landing when a vertical take-off and landing aircraft lands vertically. FIGS. 4 to 6 are diagrams for explaining a space in which a vertical take-off and landing aircraft is capable of attempting vertical landing. FIG. 7 is a system diagram for explaining an operation of a vertical take-off and landing aircraft using a hybrid electric propulsion system according to an embodiment of the present disclosure.

The vertical take-off and landing aircraft using the hybrid electric propulsion system according to an embodiment of the present disclosure may include an aircraft 1, an engine 10, a generator 20, a power management unit 40, a controller 50, a battery management system 60, a motor 80, a flight control system 90, a lift propeller 111, and a thrust propeller 112.

The aircraft 1 may include a main wing 4, an auxiliary wing 5, and a vertical wing 6 on a fuselage 2.

An aileron 91 may be installed on the main wing 4, the aileron 91 may be controlled by the flight control system 90, and depending on the posture of the aileron 91, left and right lift of the aircraft 1 may be increased or decreased (rolling).

An elevator 92 may be installed in the auxiliary wing 5, the elevator 92 may be controlled by the flight control system 90, and a nose of the aircraft 1 may be raised or lowered depending on the posture of the elevator 92.

A rudder 93 may be installed on the vertical wing 6 and may be controlled by the flight control system 90, and a flight direction of the aircraft 1 may be switched depending on the posture of the rudder 93.

The engine 10 may be installed in the aircraft 1, and in more detail, the engine 10 may be installed in the fuselage 2 and may generate power by burning fuel. The engine 10 may receive fuel from a fuel system 14 and may output power under control of an engine control device 30. The engine control device 30 may control rotation speed of the engine 10, and in more detail, may control a throttle server to control the output of the engine 10.

The generator 20 (Integrated Starter Generator (ISG)) may be connected to the engine 10 and may produce power using engine output.

The generator 20 may function as a starter, and thus, when the engine 10 is driven, power may be supplied to the generator 20 to start the engine 10.

The power management unit (PMW) 40 may manage the power, and in more detail, may manage generated power, surplus power, and battery charging power.

Power generated by the generator 20 may be managed by the power management unit 40, and for example, power may be distributed to a part that requires power, and output of the engine 10 may be controlled to be reduced through the engine control device 30 when excess power is generated while monitoring whether excess power is generated.

The battery management system 60 may include a main battery 62, and power provided from the power management unit 40 may be used to charge the main battery 62.

The power management unit 40 may provide power to the battery management system 60, and the battery management system 60 may use some power to charge the main battery 62 and may provide some power to the motor 80.

The motor 80 may be installed in the fuselage 2, the main wing 4, and the auxiliary wing 5, and may be operated by receiving power from the battery management system 60.

The lift propeller 111 may be operated by the motor 80. The lift propeller 111 may have a rotation shaft fixed vertically with respect to the fuselage 2, and thus the lift propeller 111 may generate lift of the aircraft 1.

Because the posture of the lift propeller 111 or the motor 80 is fixed, the conventional tilting structure may be excluded, and thus it may be advantageous to reduce the weight of the aircraft 1. A complex structure of the tilting structure may increase the overall weight of the aircraft, and may also reduce flight stability when the aircraft enters a cruise state from a vertical takeoff and landing state through the tilting structure.

The lift propeller 111 may be controlled by a first variable pitch control device 121 to adjust an angle of attack, and as the angle of attack of the thrust propeller 112 changes, lift may be increased or decreased (rolling).

The thrust propeller 112 may be operated by the engine 10. The thrust propeller 112 may generate thrust in the aircraft 1. The thrust propeller 112 may be controlled by a second variable pitch control device 122 to adjust an angle of attack, and as the angle of attack of the thrust propeller 112 changes, thrust may be increased or decreased (rolling).

The flight control system 90 may be mounted on the aircraft 1, may collect and receive information from various sensors, may control various electronic control devices, and may determine whether the electronic control devices are abnormal based on the collected information.

In more detail, when abnormality occurs in the battery management system 60, the battery management system 60 may be controlled by an emergency battery 72.

The controller 50 may control operations of the engine 10, the generator 20, the motor 80, and the thrust propeller 112.

The controller 50 may be implemented by the engine control device 30, the power management unit 40, a master control unit, the flight control system 90, and the like.

The master control unit may control the aircraft 1 as a whole, and the flight control system 90 and the flight control device may control an operation of the aircraft 1, and for example, may be used to control the speed, pressure, communication, posture, etc. of the aircraft 1.

The controller 50 may perform control to simultaneously provide power from the generator 20, the power management unit 40, and the battery management system 60 to the motor 80 when the aircraft 1 takes off and lands vertically.

The battery management system 60 may be determined to be abnormal when various electrical signal values output under control of the battery management system 60 are abnormal, when a problem occurs with output of the engine 10, or when the engine control device 30 is not capable of normally controlling the engine 10.

When the engine 10 is stopped, the generator 20 may not produce power and the battery may not be charged.

When a problem occurs with the battery management system 60, even if the battery is not abnormal, power may not be normally output.

In any case, because the lift propeller 111 and the thrust propeller 112 may not be capable of being operated normally, it is difficult to fly normally, and thus emergency landing needs to be attempted.

The flight control system 90 may control the posture of the aircraft 1 and may set a flight route. The posture of the aircraft 1 may be controlled by controlling the aileron 91, the elevator 92, the rudder 93, etc.

As described above, in the case of emergency, the vertical take-off and landing aircraft using the hybrid electric propulsion system according to an embodiment of the present disclosure may land the aircraft 1 as quickly and safely as possible.

Hereinafter, control operations will be described in more detail with reference to FIGS. 4 to 6.

A first control operation S1 may be an operation to reset a destination. The aircraft 1 may receive power using the emergency battery 72, but since there is a limit to the amount of electricity, the destination may be reset to the closest and safest landing site if possible.

Then, the aircraft 1 may glide to a point T for entry to a first space CEP-1 required to land the aircraft 1 or a second space CEP-2 that is wider than the first space CEP-1 in consideration of safety, and as shown in FIG. 5, the aircraft 1 may enter the first and second spaces CEP-1 and CEP-2 from any direction.

In particular, when the altitude of the aircraft 1 is too high to attempt emergency landing, the aircraft 1 may lower the altitude thereof through circling flight or glide flight prior to entry to the first and second spaces CEP-1 and CEP-2, and as shown in FIG. 5, the aircraft 1 may enter the first and second spaces CEP-1 and CEP-2 from any direction and may attempt emergency landing.

In a second control operation S2, control may be performed to maintain lift and to minimize air resistance in flight. In more detail, the aircraft 1 may glide using inertia of the aircraft 1 or the wind, but the glide flight may be unstable, and thus the lift propeller 111 may be operated to maintain lift. In addition, the thrust propeller 112 may reduce resistance by changing a pitch angle to be parallel to a flight direction.

Descent flight may be performed during the second control operation S2.

In a third control operation S3, control may be performed to improve the lift when the aircraft 1 reaches the sky above the destination in which it is possible to attempt emergency landing, and control may be performed to tilt the nose of the aircraft 1 upward. That is, when the aircraft 1 approaches the landing point, the flight control system may tilt the nose of the aircraft 1 upward.

A fourth control operation S4 may be an operation of controlling the second variable pitch control device 122 to gradually reduce the lift and to prevent thrust from acting on the aircraft 1 at a moment of landing.

If there is a problem with power supply, the vertical take-off and landing aircraft using the hybrid electric propulsion system according to an embodiment of the present disclosure as configured above may set a landing site determined to be the safest to the destination and may attempt vertical landing while saving power of the emergency battery 72 as much as possible and securing safety.

Automatic flight for safe landing in the case of emergency landing of a rotor craft (helicopter) will be described with reference to FIG. 2.

FIG. 2 shows altitude and speed for landing an aircraft depending on a correlation diagram kn between a height H and a flight speed V of the aircraft.

In FIG. 2, A is the minimum altitude for safely landing a hovering aircraft.

In FIG. 2, B is the maximum altitude for safe landing when taking off.

In FIG. 2, C is the altitude and speed for safe landing.

In FIG. 2, D is an area in which the speed of the aircraft is too high to land.

FIG. 3 shows altitude and speed for landing an aircraft depending on a correlation diagram kn-1 between a height H and a flight speed V of a fixed wing aircraft. The fixed wing aircraft 1 may be an aircraft having a fixed wing such as the main wing 4 or the auxiliary wing 5.

Automatic flight for safe landing in the case of emergency landing of a fixed wing aircraft will be described with reference to FIG. 3.

In FIG. 3, A-1 is the minimum altitude for safely landing a hovering aircraft, and it may be seen that a height H is much lower than A of FIG. 2.

In FIG. 3, B is the maximum altitude for safe landing when taking off.

In FIG. 3, C-1 is the altitude and speed for safe landing. It may be seen that the height H is much lower than C of FIG. 2.

In FIG. 3, D-1 is an area in which speed of the aircraft is too high to land. It may be seen that a speed V is much higher than D of FIG. 2.

That is, as seen from comparison between FIGS. 2 and 3, compared with an aircraft having only a rotary wing, in the case of the aircraft 1 having a fixed wing or the aircraft 1 having both a fixed wing and a rotary wing, an area in which safe landing is not allowed may be reduced and there may be an advantage in that emergency landing is capable of being attempted in a much more diverse environment and an area in which takeoff and landing is capable of being attempted is increased.

Proximity to a landing site described above will be further described with reference to FIGS. 4 to 6.

In FIG. 4, when the aircraft 1 malfunctions, the aircraft 1 may attempt glide flight and may attempt emergency landing from a point T.

In FIG. 4, "a" is an angle of approach to a ground G with respect to the ground G when the aircraft 1 attempting automatic emergency landing approaches the ground G.

CEP-1 of FIG. 4 is a first space required to land the aircraft 1 and CEP-2 of FIG. 4 is a second space that is wider than the first space CEP-1 in consideration of safety.

In FIG. 4, H is a height at which the aircraft 1 attempts emergency landing.

That is, when the aircraft 1 arrives at the point T between the approach angle and the height, it may be understood that the aircraft 1 approaches the landing site.

The vertical take-off and landing aircraft using the hybrid electric propulsion system according to an embodiment of the present disclosure may use the lift propeller 111 for vertical take-off and landing.

The controller 50 may control the first and second variable pitch control devices 121 and 122 to reduce thrust of the thrust propeller 112 not to affect flight of the aircraft 1 when the aircraft 1 takes off and lands vertically by controlling the first and second variable pitch control devices 121 and 122. In more detail, an angle of attack of the thrust propeller 112 may be controlled to approach 0 degrees, and thus thrust by the thrust propeller 112 may become "0" so as not to affect flight of the aircraft 1 at all.

The vertical take-off and landing aircraft using the hybrid electric propulsion system according to an embodiment of the present disclosure may use the thrust propeller 112 for transition flight or cruise flight.

The vertical take-off and landing aircraft using the hybrid electric propulsion system according to an embodiment of the present disclosure may achieve desired thrust by adjusting an angle of attack of the thrust propeller 112 at a transition flight altitude during transition flight.

Likewise, the vertical take-off and landing aircraft using the hybrid electric propulsion system according to an embodiment of the present disclosure may generate required thrust by adjusting an angle of attack of the thrust propeller 112 during cruise flight.

The vertical take-off and landing aircraft using the hybrid electric propulsion system according to an embodiment of the present disclosure may use both the lift propeller 111 and the thrust propeller 112 during transition flight, and a ratio of electrical energy provided to the lift propeller 111 and mechanical energy provided to the thrust propeller 112 may be controlled by the controller 50 depending on a flight type of the aircraft 1.

In another aspect, in the first control operation S1, the flight control system 90 may warn a pilot of an emergency situation, may manually receive information on a destination by input of the pilot, and may automatically change the destination when there is no input within a set time.

Because the aircraft 1 flies very fast, the pilot needs to make quick decisions but may hesitate and miss important decisions. In this point of view, according to an embodiment of the present disclosure, when there is no input for a destination within a set time, the flight control system 90 may induce safe vertical landing by automatically changing the destination.

The set time may be limited to 5 to 10 seconds immediately after notifying the emergency situation. That is, even if the pilot fails to notice warning for an unknown reason, the pilot's safety may be ensured by changing the destination as quickly as possible.

In another aspect, the destination may be automatically changed by selecting the closest landing site that does not deviate from the flight route as a first priority landing site and selecting the closest landing site as a second priority landing site when the first priority landing site is too far for emergency flight.

If it is determined that an initial destination is an optimal destination in the current situation, the initial destination may be input again.

That is, the flight route may be generally set to the shortest distance while avoiding a no-fly zone with respect to the destination, and since the amount of power of the emergency battery 72 is limited, the destination needs to be selected within a possible flight distance.

A pilot who is good at geography and has a lot of flying experience or a skilled pilot is capable of easily finding an optimal destination, but in an emergency situation, anyone may panic, and even if they know an appropriate destination, there may not be capable of entering the destination properly.

Thus, the vertical take-off and landing aircraft according to an embodiment of the present disclosure may induce safe landing by automatically selecting an optimal landing site destination in consideration of a distance and a flight direction.

In another aspect, in the vertical take-off and landing aircraft using the hybrid electric propulsion system according to an embodiment of the present disclosure, the destination may be automatically changed by selecting a landing site again by navigating to avoid first and second geographical features when there is the first geographical feature that impedes glide flight to the destination or the second geographical feature by which the aircraft cannot land.

As shown in FIG. 6, the first geographical feature may be an object with which an aircraft is likely to collide during glide flight, and for example, may be a mountain, a building, or a sculpture.

As shown in FIG. 6, the second geographical feature may be a river, a stream, a bridge, a village, or a city.

The first and second geographical features may be checked from map data of an automatic navigation system, and thus the aircraft may search for a landing destination that minimizes accident risk.

As shown in FIG. 6, when there are the first and second geographical features around a recommended landing site, entry to a first point T1 may be abandoned, and the aircraft may glide toward a second point T2 of a newly set landing site.

In the second control operation S2, the first variable pitch control device 121 may be controlled to maintain the lift of the aircraft 1, and the second variable pitch control device 122 may be controlled to minimize air resistance to flight of the aircraft 1.

That is, when the aircraft 1 flies in an emergency situation, if the flight speed slows, lift may decrease, and in this case, the vertical take-off and landing aircraft according to the present disclosure may increase the lift to rise again by increasing the speed using gravity during descent flight, and the lift may be complemented by performing control to increase the lift of the lift propeller 111. The thrust propeller 112 may secure safe flight by adjusting a blade direction parallel to a flight direction to reduce air resistance.

In the third control operation S3, when the aircraft 1 approaches the sky above the destination in which it is possible to attempt emergency landing, the first variable pitch control device 121 may be controlled to improve the lift of the lift propeller 111, and the flight control system 90 may perform control to switch the nose of the aircraft 1 to an upward direction.

Thus, the flight speed of the aircraft 1 may be reduced more quickly by applying resistance to inertial motion that proceeds in a flight direction of the aircraft 1, and the lift propeller 111 may be operated to improve the lift to prevent sudden falls when the aircraft 1 lands vertically.

In the fourth control operation S4, when the aircraft 1 reaches a height for vertical landing, the first variable pitch control device 121 may be controlled to gradually reduce the lift of the lift propeller 111, and the second variable pitch control device 122 may be controlled to prevent thrust from acting on the aircraft at a moment of landing.

Accordingly, the vertical take-off and landing aircraft according to an embodiment of the present disclosure may attempt vertical landing after slow vertical landing or gliding and, because no thrust is applied to the aircraft 1 immediately after landing, the aircraft 1 may remain in place in the landing position.

As such, in a vertical take-off and landing aircraft according to another embodiment of the present disclosure, when normal flight is difficult due to malfunction, etc., the aircraft may set a target landing site to glide to the landing site, may descend to generate lift after passing through the point T for entry to the first space CEP-1 required to land the aircraft 1 or the second space CEP-2 that is wider than the first space CEP-1 in consideration of safety, may reduce the flight speed while ascending by tiling the nose of the aircraft upward when the aircraft is lowered to a predetermined height, and may then attempt emergency landing vertically again.

That is, the vertical take-off and landing aircraft according to another embodiment of the present disclosure may perform safe landing close to normal vertical take-off and landing in an emergency situation to prevent an extreme situation in which the aircraft abruptly crashes to the ground and occupants die due to malfunction of a power source such as a thrust or lift driving device or a battery.

Although embodiments of the present disclosure have been described above with reference to the accompanying drawings, those skilled in the art to which the present disclosure pertains will be able to understand that the present disclosure may be embodied in other specific forms without changing the technical spirit or essential features thereof.

Therefore, the embodiments described above are to be understood as illustrative and not restrictive in all respects, and the scope of the present disclosure is indicated by the claims described below, and all changes or modifications derived from the meaning and scope of the claims and their equivalents should be construed as being included in the scope of the present disclosure.

INDUSTRIAL APPLICABILITY

A vertical take-off and landing aircraft using a hybrid electric propulsion system according to an embodiment of the present disclosure may be used to control emergency vertical landing of an aircraft.

The invention claimed is:

1. A vertical take-off and landing aircraft using a hybrid electric propulsion system, the vertical take-off and landing aircraft comprising:
   a first variable pitch control device configured to control a pitch of a lift propeller to generate lift in the vertical take-off and landing aircraft;
   a second variable pitch control device configured to control a pitch of a thrust propeller to generate thrust in the vertical take-off and landing aircraft; and
   a flight control system disposed in the vertical take-off and landing aircraft, and configured to control a battery management system using an emergency battery when abnormality occurs in the battery management system, to control a posture of the vertical take-off and landing aircraft and to set a flight route,
   wherein the vertical take-off and landing aircraft is configured to perform control operations comprising:
      a first control operation of resetting a destination;
      a second control operation of maintaining the lift and performing control to minimize air resistance of flight;
      a third control operation of performing control to improve the lift and performing control to tilt a nose upward; and
      a fourth control operation of performing control of the first variable pitch control device to reduce the lift and performing control of the second variable pitch control device to prevent thrust from acting on the vertical take-off and landing aircraft at a moment of landing,
   wherein, in the second control operation, the first variable pitch control device is configured to maintain the lift by lowering the vertical take-off and landing aircraft and increasing flight speed, and the second variable pitch control device is configured to minimize the air resistance of the flight,
   wherein, in the third control operation, the first variable pitch control device is configured to improve the lift of the lift propeller when the vertical take-off and landing aircraft approaches sky above the destination at which attempting emergency landing is possible, and
   wherein, in the fourth control operation, when the vertical take-off and landing aircraft reaches a height for vertical landing, the first variable pitch control device is configured to reduce the lift of the lift propeller, and the second variable pitch control device is configured to prevent the thrust from acting on the vertical take-off and landing aircraft at the moment of landing.

2. The vertical take-off and landing aircraft of claim 1, wherein, in the first control operation, the flight control system is configured to warn a pilot of an emergency situation, manually receive information on the destination by input of the pilot, and automatically change the destination when there is no input within a set time from a warning time.

3. The vertical take-off and landing aircraft of claim 2, wherein the flight control system is further configured to automatically change the destination by selecting a closest landing site that does not deviate from the flight route as a first priority landing site and selecting another closest landing site as a second priority landing site when the first priority landing site is determined to be too far for emergency flight.

4. The vertical take-off and landing aircraft of claim 3, wherein the flight control system is further configured to automatically change the destination by selecting the closest landing site by navigating to avoid a first geographical feature when the first geographical feature is determined to impede glide flight to the destination or to avoid a second geographical feature due to which the vertical take-off and landing aircraft is determined to be unable to land.

5. The vertical take-off and landing aircraft of claim 1, wherein, in the third control operation, the flight control system is configured to tilt the nose upward when the vertical take-off and landing aircraft approaches the sky above the destination at which attempting the emergency landing is possible.

6. The vertical take-off and landing aircraft of claim 1, wherein the battery management system has a main battery, and the battery management system is configured to use the emergency battery when the abnormality occurs in the battery management system.

7. The vertical take-off and landing aircraft of claim 1, wherein the vertical take-off and landing aircraft has a plurality of lift propellers non-tiltably disposed on the vertical take-off and landing aircraft.

8. The vertical take-off and landing aircraft of claim 1, wherein the thrust propeller is configured to change a pitch angle to be parallel to a flight direction to reduce the air resistance.

9. The vertical take-off and landing aircraft of claim 1, wherein the first variable pitch control device is configured to adjust a pitch angle of the lift propeller to maintain the lift by lowering the vertical take-off and landing aircraft and increasing flight speed, to improve the lift when the vertical take-off and landing aircraft approaches sky above the destination at which attempting emergency landing is possible, or to reduce the lift when the vertical take-off and landing aircraft reaches the height for vertical landing.

10. The vertical take-off and landing aircraft of claim 1, wherein the second variable pitch control device is configured to adjust a pitch angle of the thrust propeller to minimize the air resistance of the flight or to prevent the thrust from acting on the vertical take-off and landing aircraft at the moment of landing.

* * * * *